United States Patent [19]

Miller et al.

[11] Patent Number: 5,870,602
[45] Date of Patent: Feb. 9, 1999

[54] MULTI-PROCESSOR SYSTEM WITH SYSTEM WIDE RESET AND PARTIAL SYSTEM RESET CAPABILITIES

[75] Inventors: David A. Miller, Houston; Kenneth A. Jansen, Spring; Paul R. Culley, Cypress; Mark Taylor; Javier F. Izquierdo, both of Houston, all of Tex.

[73] Assignee: Compaq Computer Corporation, Houston, Tex.

[21] Appl. No.: 14,369

[22] Filed: Jan. 27, 1998

Related U.S. Application Data

[63] Continuation of Ser. No. 723,841, Sep. 30, 1996, Pat. No. 5,737,604, which is a continuation of Ser. No. 480,874, Jun. 7, 1995, Pat. No. 5,611,078, which is a continuation of Ser. No. 152,241, Nov. 12, 1993, Pat. No. 5,465,360, which is a continuation of Ser. No. 15,314, Feb. 9, 1993, abandoned, which is a continuation of Ser. No. 431,653, Nov. 3, 1987, abandoned.

[51] Int. Cl.⁶ .................................................... G06F 9/00
[52] U.S. Cl. ......................................... 395/651; 711/166
[58] Field of Search ..................................... 395/651, 652, 395/653, 200.5, 200.51, 200.52, 497.01; 711/166

[56] References Cited

U.S. PATENT DOCUMENTS

| | | | |
|---|---|---|---|
| 4,335,426 | 6/1982 | Maxwell et al. | 395/725 |
| 4,455,601 | 6/1984 | Griscom et al. | 395/575 |
| 4,591,975 | 12/1986 | Wade et al. | 395/725 |
| 4,633,392 | 12/1986 | Vincent et al. | 395/725 |
| 4,679,166 | 7/1987 | Berger et al. | 364/900 |
| 4,779,187 | 10/1988 | Letwin | 364/200 |
| 4,787,032 | 11/1988 | Culley | 364/200 |
| 4,823,256 | 4/1989 | Bishop et al. | 395/575 |
| 4,825,358 | 4/1989 | Letwin | 395/700 |
| 5,027,273 | 6/1991 | Letwin | 395/400 |
| 5,101,339 | 3/1992 | Fairman et al. | 395/400 |
| 5,109,512 | 4/1992 | Bahr et al. | 395/650 |
| 5,381,530 | 1/1995 | Thayer | 395/275 |
| 5,590,554 | 1/1997 | Glazer et al. | 395/200 |

FOREIGN PATENT DOCUMENTS

| | | |
|---|---|---|
| EP-A-0 191 402 | 8/1986 | European Pat. Off. . |
| EP-A-0 309 (995) | 5/1989 | European Pat. Off. . |

OTHER PUBLICATIONS vol. 6, No. 206 (P–149) (1084), Oct. 9, 1982, JPX.
Intel Corporation, Microprocessors, pp. 4–170 to 4–304, 1990.
Intel Corporation, Microprocessors, pp. 4–343 to 4–409, 1990.
Compaq Computer Corp., Compaq Deskpro 386/20 Technical Reference Guide, vol. 1, pp. 2–108 to 2–122, Oct. 1987.
Compaq Computer Corp., Compaq Deskpro 386/20 Technical Reference Guide, vol. 1, pp. 4–32 to 4–36, Oct. 1987.
Compaq Computer Corp., Compaq Deskpro 386/20 Technical Reference Guide, vol. 1, pp. 4–43 to 4–44, Aug., 1988.
Compaq Computer Corp., Compaq Deskpro 386/20 Technical Reference Guide, vol. 1, pp. 4–27 to 4–28, May 1987.

*Primary Examiner*—Kevin A. Kriess
*Attorney, Agent, or Firm*—Sharp, Comfort & Merrett, P.C.

[57] ABSTRACT

A multiprocessor system includes first and second processing units. Each of these processing units includes at least a processor and preferably also a cache memory, a cache memory controller and a numerical coprocessor. Each processing unit is reset in response to a system reset signal but only selected portions of the processing units are reset in response to a partial-reset signal. The system can also include a number other components such as video circuitry, a hard disk drive, bus interface circuitry, a speaker, a keyboard controller and a keyboard.

78 Claims, 7 Drawing Sheets

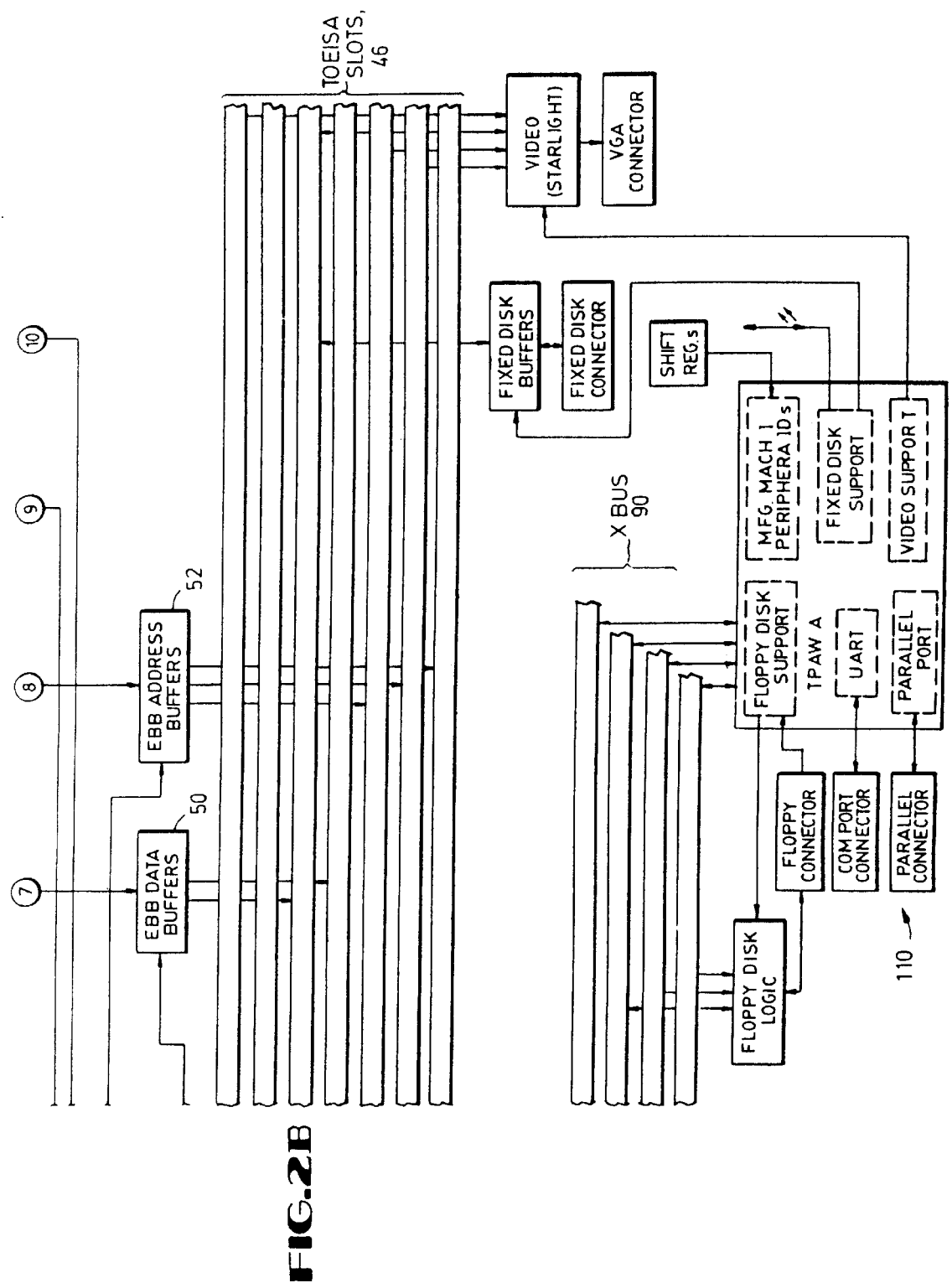

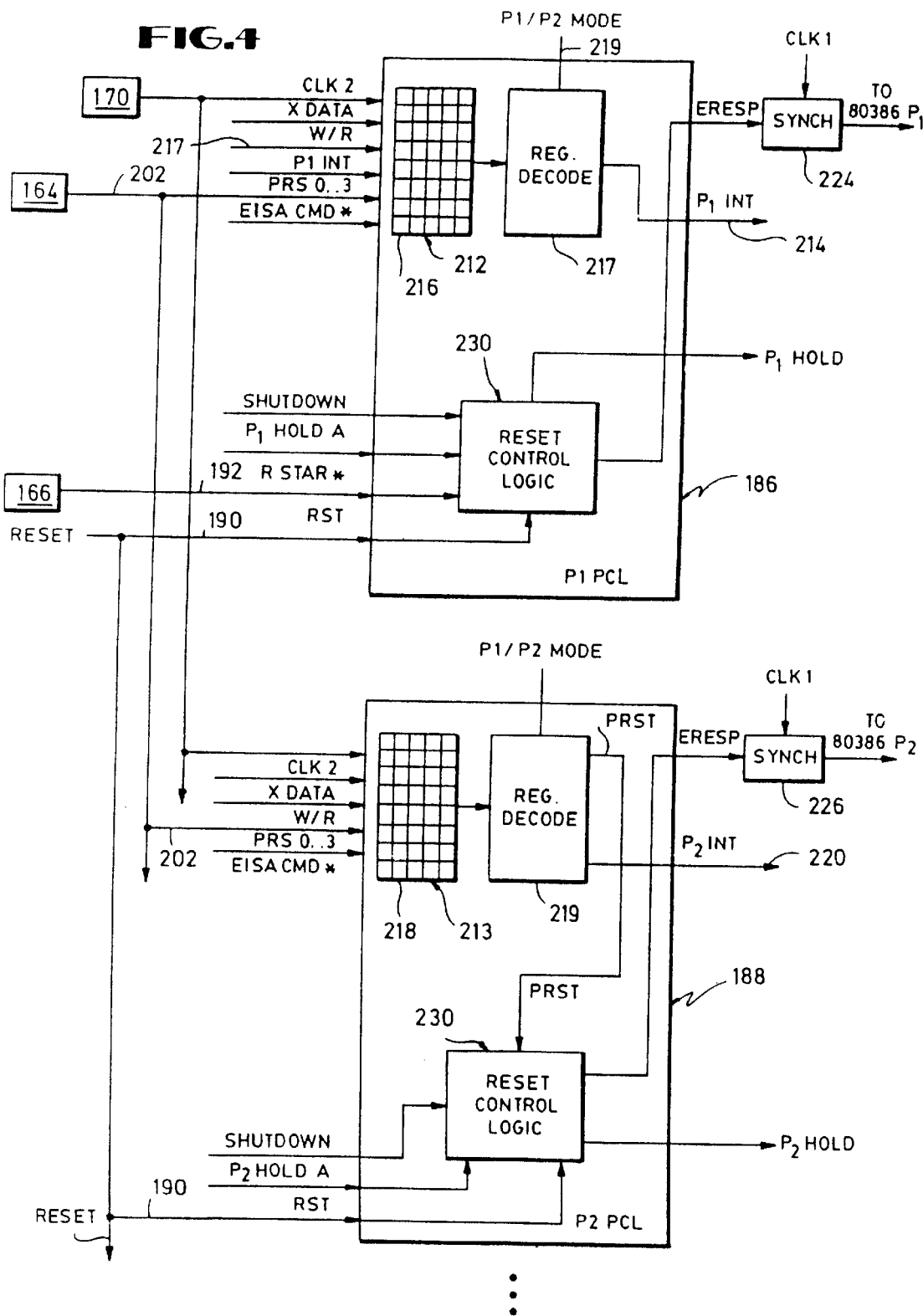

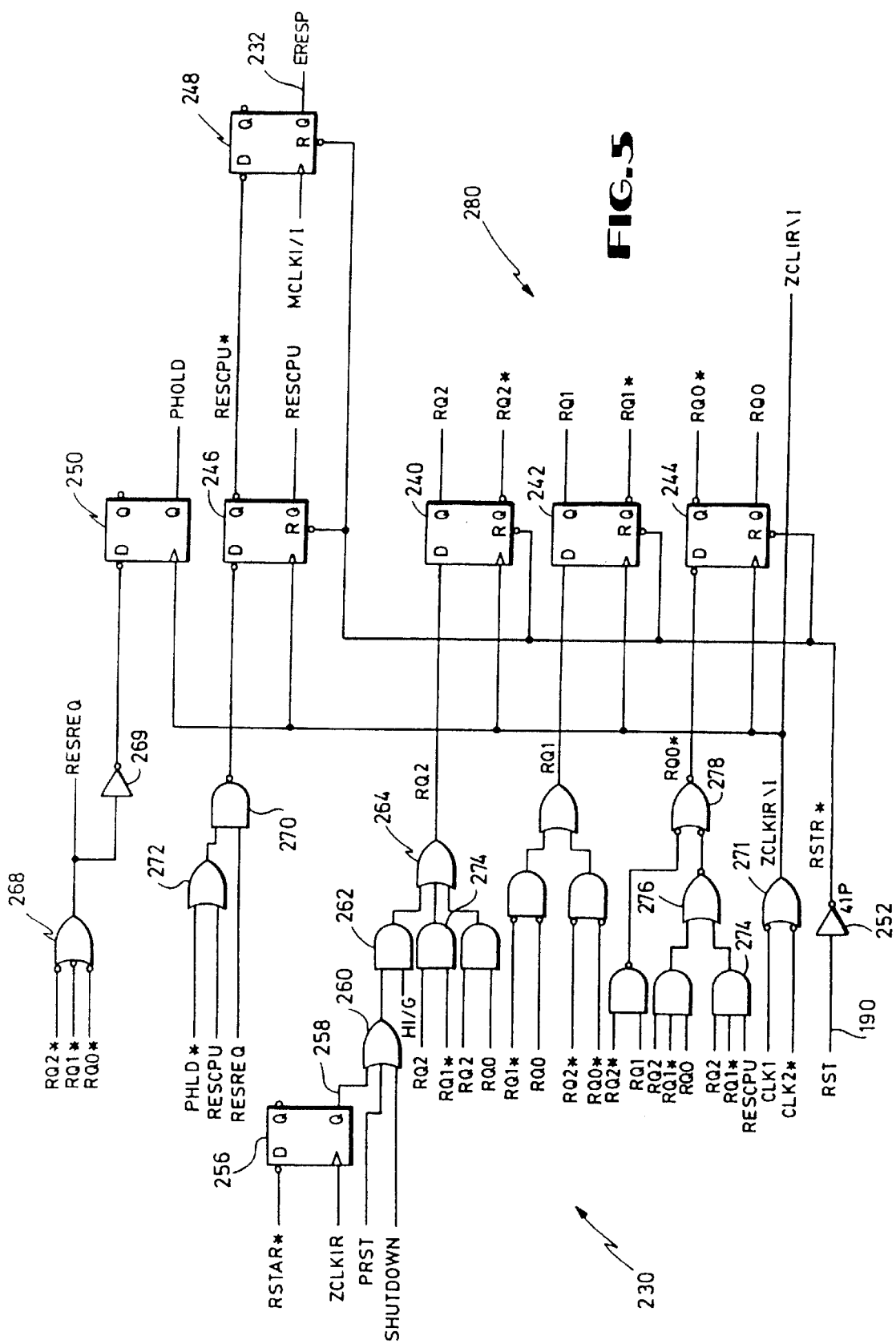

MULTI-PROCESSOR SYSTEM WITH SYSTEM WIDE RESET AND PARTIAL SYSTEM RESET CAPABILITIES

This is a continuation of 08/723,841 filed Sep. 30, 1996 and now U.S. Pat. No. 5,737,604, which is a continuation of 08/480,874 filed Jun. 7, 1995 and now U.S. Pat. No. 5,611,078, which is a continuation of 08/152,241 filed Nov. 12, 1993 and now U.S. Pat. No. 5,465,360, which is a continuation of 08/015,314 filed Feb. 9. 1993 now abandoned, which is a continuation of 07/431,653, filed Nov. 3, 1989, abandoned.

BACKGROUND OF THE INVENTION

1. Field of the Invention

This invention relates to a method and apparatus for independently controlling and implementing the reset of the processors and cache memory system controllers in multiple processor computer systems utilizing cache memory.

2. Discussion of the Related Art

Personal computer systems have developed from systems utilizing a single processing unit or CPU to systems which include multiple processors operating in parallel. One of the first developments was to include a second arithmetic coprocessor in parallel with the main CPU to perform time-consuming and complex arithmetic tasks leaving the main CPU free to perform system control, input/output, memory operations and other less time-consuming code execution. Systems incorporating the Intel 80386 processor and 80387 coprocessor are one common example of such more advanced systems.

In addition to the development of arithmetic coprocessors, memory systems used by the processor have evolved from single units of read only memory for storing fixed system instructions and static random access integrated circuit memory to further include peripheral memory devices such as floppy-disk and fixed-disk memories and associated interface and control circuity.

As the speed of processors was enhanced, it became necessary to enhance the speed at which memory operations could be performed so as to take advantage of the newer high speed processors such as the Intel 80386. High speed static RAM devices were available, but to implement the entire memory requirement with high speed RAM was too expensive for personal computer systems. One solution to the problem was the implementation of what is known as a cache memory system.

In a cache memory system a small amount of more expensive fast memory, typically static RAM devices, is used for high speed execution and slower, less expensive dynamic RAM and peripheral devices are used for the bulk memory requirements. Data or code contained in portions of the main memory is duplicated in the fast cache memory so that operations requiring only data or code in cache memory can be executed quickly. Idealized cache memory systems seek to match the upcoming processor code and data requests to code and data maintained in cache memory by changing the contents of the cache memory as the processor executes code or instructions to minimize the number of times slower memory has to be accessed by the processor.

Updating and maintaining the directory to the cache memory is performed by a device known as a cache controller. One such device is the Intel 82385 cache controller designed for use with the 80386 processor. The cache controller also determines whether the requested data or code is resident in cache or whether it is necessary to retrieve it for the processor from main memory. The cache controller therefore interfaces between the processor and the cache memory and the main memory via one or more system busses. Details of an example of such systems is set forth in the Intel system design handbooks for the 80386 family, such as the Microprocessor and Peripheral Handbook Volume 1, specifically pages 4–292 through 4–353 of the October, 1988 reference manual.

Further development of personal computer systems led to the design of systems including multiple processors, each having an associated cache memory and cache controller, as well as a coprocessor. In such systems one of the processors is typically the primary processor which controls and utilizes the other secondary processors. The Intel Microprocessor and Peripheral Handbook at page 4–295 disclosed such a multiple processor system where each processor and associated cache system were connected to a common local bus which is then connected to a system bus. In the Intel design, another device known as the Intel 82380 32-bit DMA controller was also connected to the local bus and utilized to provide direct memory access control, interrupt control, timing, wait state generation, dynamic (non-cache) memory refreshing and processor reset control. In the Intel system, both processors and cache controllers interface to the system bus via a common local bus interface. As designed, the cache controllers and associated processors were reset by a common signal.

Resets are utilized to interrupt all system activity and bring all elements of the system to a known initialization state. Resets are assigned the highest priority among system signals and when a reset signal is asserted, all activity ceases. In 80386 and earlier 80286 based systems reset signals can be generated by hardware such as a switch, by operator command via a keyboard or under program control. A hardware reset occurs when the system is first energized or turned on. Software or program controlled resets are utilized by programmers for a variety of reasons.

One example of the use of a programmed reset relates to setting the mode of the processor. Both 80286 and 80386 processors are initialized in a mode known as the Real Mode. Real Mode operation is typically only utilized as a prelude to system operation such as during a system initialization sequence which occurs on power up. Real Mode operation utilizes a system addressing scheme which is limited and greatly restricts the ability of the processor to address large memory spaces. In the 80386 Real Mode operation limits the processor to one megabyte of addressable memory space. Typically, once initialization is completed, the system transitions to Protected Mode. Protected Mode allows the processor to use virtual addressing to expand the addressable memory to four terabytes.

In the design of the 80286 family it was not anticipated that after system initialization it would be desirable to revert from Protected Mode to Real Mode, and consequently no provision was made to accomplish this under program control. Software designed for the 80286 system frequently incorporated software initiated resets to cause the 80286 to reset in order to revert from Protected Mode to Real Mode. In order to maintain software compatibility with software designed for 80286 systems, it is necessary to accommodate software resets as a method of resetting the processor to Real Mode.

In prior art systems using multiple processors and cache controllers connected via a common bus the utilization of a reset signal caused all processors and cache controllers to reset. On reset the 82385 cache controller clears the cache memory by executing a cache flush operation which invalidates all data stored in the cache. When 82385 controllers are utilized in master mode, a reset causes the controller to latch the 80386 reset values to the system bus interface by emitting a pulsed output signal on its address clock pulse (BACP) output pin. This results in the 82385 trying to acquire control of the system bus. In situations where the reset is a software reset intended only to reset one processor, as distinguished from a power up, hardware system reset, the prior art provided no simple and efficient way to avoid bus contention by the 82385 controllers which tried to acquire the bus while one of the non-reset processors was operating. In multiprocessor systems, it is desirable to independently reset each processor. The prior art provides no suitable mechanism to meet this need.

The present invention addresses these shortcomings of prior art systems and provides a system wherein each processor may be reset independently under program control after system initialization. The present invention also provides a system for resetting each processor independently without introducing cache memory incoherency. A cache memory incoherency may occur when more than one device has access to common memory space. In such situations, one device may make an alteration to data in memory which is not also made to the duplicated data in the cache memory.

SUMMARY OF THE INVENTION

The present invention provides a system of independently resetting processors in a multiprocessor cache memory environment. On power up, a hardware reset, all processors and cache memory devices are reset to initialization values. The cache controllers are reset only on hardware reset, and placed in a hold state after the processor reset signals are released. Since power up resets of the processors and cache controllers are synchronized, no bus contention results. After hardware reset, when the secondary processors acknowledge a hold request, the primary processor is given access to the common processor or host bus until system protocol determines one of the other processors or system elements, such as the extended industry standard (EISA) bus in EISA systems, requires the bus.

Software or programmed resets cause only the selected processor(s) and not the cache controllers to be reset. Programmed resets are synchronized to hold acknowledge signals from the processors so that resets do not occur during program execution by one or more processors thereby avoiding any cache memory incoherency. The primary processor can be reset under program control consistent with existing software convention without effecting the operation of the cache controllers or the secondary processors. The primary processor may also be independently reset in response to a keyboard initiated instruction. The secondary processors can be program reset by setting a reset bit located in a designated secondary processor control register addressable under program control, or via the user interface keyboard, or by the primary processor. All processors are reset in response to system shutdown signals.

BRIEF DESCRIPTION OF THE DRAWINGS

A better understanding of the present invention can be obtained when the following detailed description of the preferred embodiment is considered in conjunction with the following drawings, in which:

FIG. 4 is a schematic diagram of one portion of the reset control circuit which forms a part of the system shown in FIGS. 1 and 2.

FIG. 5 is a schematic diagram of a second portion of the reset control circuitry which forms a part of the system shown in FIGS. 1 and 2.

DETAILED DESCRIPTION OF THE PREFERRED EMBODIMENT

Figure 1A:
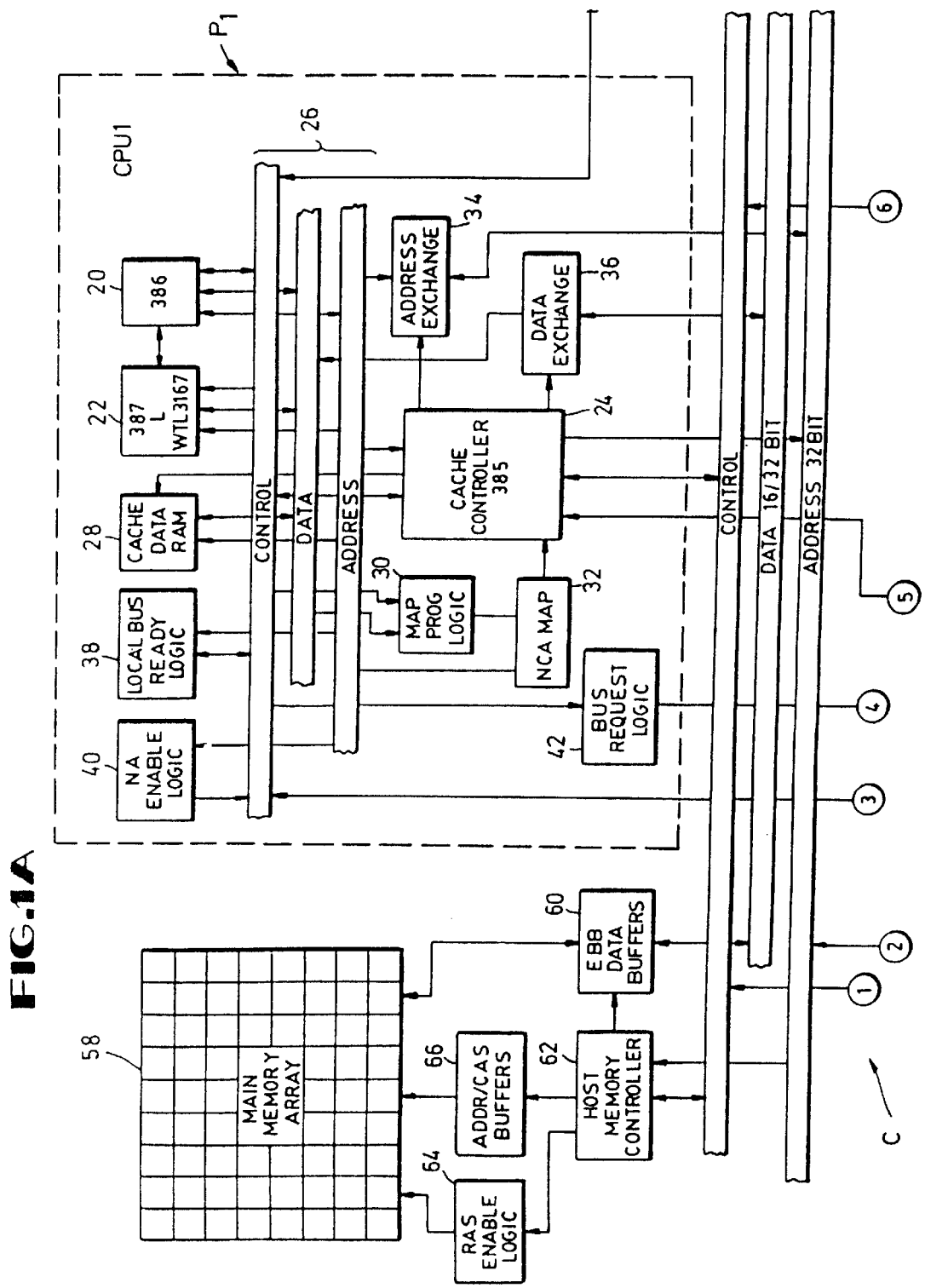
FIG. 1 is a schematic block diagram of a portion of a computer system incorporating the present invention.
Figure 1B:
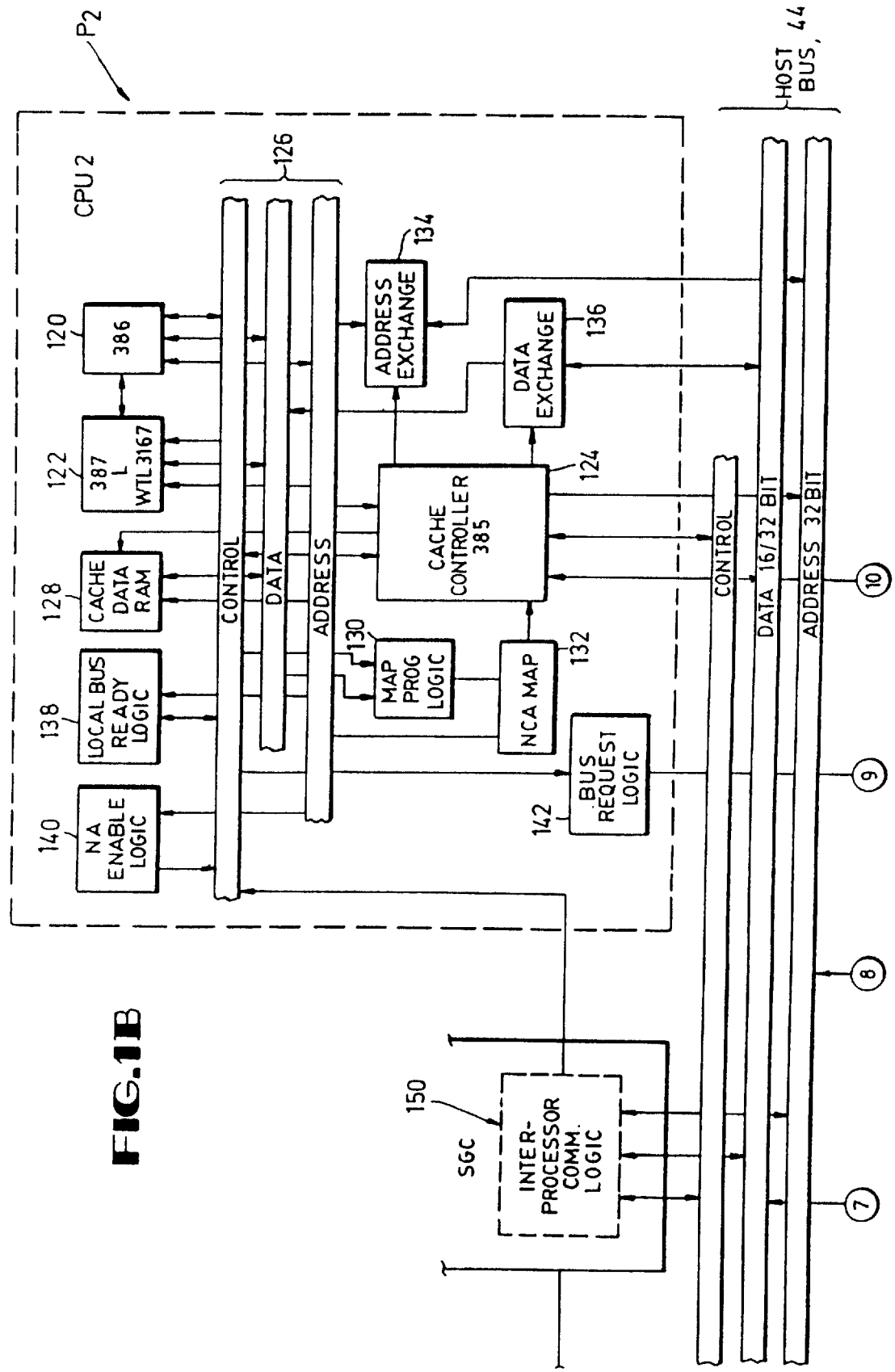
Figure 2A:
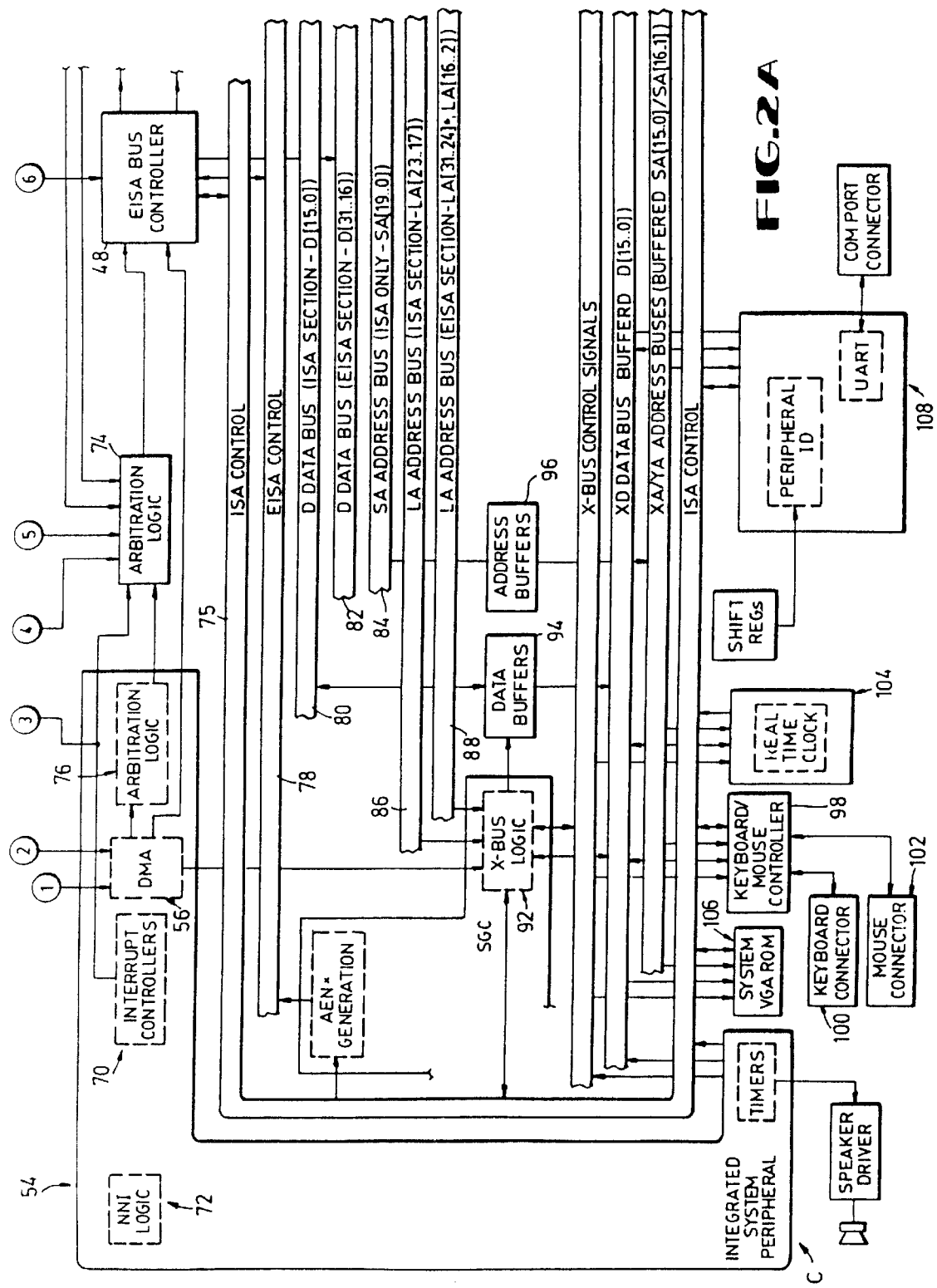
FIG. 2 is a schematic block diagram of a portion of a computer system incorporating the present invention.

Referring now to FIGS. 1 and 2, the letter C designates generally a computer system incorporating the present invention. For clarity, system C is shown in two portions, with the interconnections between FIGS. 1 and 2 designated by reference to the circled numbers one to ten. System C is comprised of a number of block elements interconnected via three busses. Throughout this specification in signal mneumonics an asterisk following the signal descriptors indicates the signal is active at a logic low level.

In FIG. 1, a dual processor cache memory computer system is depicted. A primary processing unit P1 comprises a processor 20, a numerical coprocessor 22 and a cache memory controller 24 and associated logic circuits connected to a processor bus 26. Associated with cache controller 24 is a high speed cache data random access memory 28, cache memory map programmable logic circuit 30, non-cacheable cache memory map logic circuit 32, address exchange latch circuit 34 and data exchange transceiver 36. Associated with P1 also are local bus ready logic circuit 38, next address enable logic circuit 40 and bus request logic circuit 42.

Processor 20 is preferably an Intel 80386 microprocessor. Processor 20 has its control, address and data lines interfaced to processor bus 26. Coprocessor 22 is preferably an Intel 80387 numeric coprocessor interfacing with processor bus 26 and processor 20 in the conventional manner. Cache ram 28 is preferably a suitable high-speed static random access memory circuit which interfaces with the address and data elements of bus 26 under control of cache controller 24 to carry out required cache memory operations. Controller 24 is preferably an Intel 82385 cache controller configured to operate in two-way set associative master mode. Address latch 34 and data transceiver 36 interface the cache controller 24 with processor 20 and provide a local bus interface between processor bus 26 and a host bus 44.

Circuit 38 is a logic circuit which provides a bus ready signal to control access to bus 26 and validate address information. Enable circuit 40 is utilized by processor 20 to enable the next address of data or code to be utilized by sub-system elements in pipelined address mode.

Circuit 30 is a programmable logic circuit which is utilized by cache controller 24 to map data locations in cache ram 28. Non-cacheable map circuit 32 is utilized by processor 20 to designate areas of cache ram that are non-cacheable to avoid any cache memory incoherency for data or code at specified main memory locations. Bus request logic circuit 42 is utilized by processor 20 and associated elements to request access to the system bus 46 in situations such as when requested data is not located in cache memory 28 and access to system main memory is required. (FIG. 2).

In the drawings, system C is configured having the processor bus 26, host bus 44 and extended industry standard bus 46. The details of the portion of the system illustrated in FIG. 2, and not discussed in detail below are not significant to the present invention other than to illustrate an example of a fully configured dual processor cache memory system. The EISA specification version 3.1 is included in Appendix 1 of U.S. Pat. No. 5,101,492 to fully explain the requirements of an EISA system. The portion of system C illustrated in FIG. 2 is essentially a conventionally configured EISA system which includes the necessary bus 46, EISA bus controller 48, data transceiver 50 and address latch 52 to interface between bus 46 and host bus 44. Also illustrated in FIG. 2 is an integrated system peripheral 54, such as the Intel 82380 DMA controller and integrated system support peripherals.

Circuit 54 includes a direct memory access controller 56 for controlling direct access to main memory 58 (FIG. 1) by system elements via bus 44. Memory array 58 comprises a memory circuit array of size suitable to accommodate the particular requirements of the system. Circuit 54 also includes interrupt controllers 70, non-maskable interrupt logic 72 and system timers 73 which allow control of interrupt signals and generate necessary timing signals and wait states in a conventional manner. In the preferred embodiment, processor generated interrupt requests are controlled via dual interrupt control circuits emulating Intel 8259 interrupt controllers resident in system integrated peripheral circuit 54. Circuit 54 also includes DMA arbitration logic 76 which controls and arbitrates among system DMA requests.

Memory array 58 (FIG. 1) is preferably dynamic random access memory. Memory 58 interfaces with bus 44 via data buffer circuit 60 and memory controller circuit 62 in a conventional manner. Buffer 60 performs data transceiving and parity checking functions. Controller 62 interfaces with memory 58 via an address multiplexer circuit which includes row address enable logic circuit 64 and column address circuit 66 in a conventional manner.

Arbitration for busses 44 and 46 is controlled by arbitration logic circuit 74.

Bus 46 includes ISA and EISA control elements 75 and 78, ISA and EISA data elements 80 and 82 and address elements 84, 86 and 88 in a standard EISA configuration. System peripherals are interfaced via X bus 90 in combination with the control element 75 from bus 46. Control and data/address transfer for X bus 90 are facilitated by X-bus control logic 92, data transceiver 94 and address latch 96.

Attached to X bus 90 are various peripheral devices such as keyboard/mouse controller 98 which interfaces bus 90 with a suitable keyboard and mouse via connectors 100 and 102, respectively. Also attached to X bus 90 are real time clock circuit 104 and a read only memory circuit 106 which contains basic operations software for the system C and for system graphics. A serial communications port 108 is also connected to the system C via X-bus 90.

External memory and control interface, parallel printer and communications ports, and video support circuits are provided in block circuit 110 in a conventional manner.

Referring now back to FIG. 1, a secondary processor P2 is illustrated. Processor P2 is a duplicate of processor P1 and consequently it is not necessary to describe the individual elements in detail. Elements of P2 are the same as corresponding elements of P1 and have been numbered so that elements of P2 bear numbers 120, 122, 124 etc. corresponding to elements 20, 22 and 24 in processor P1.

Arbitration logic circuit 74 arbitrates requests for access to host bus 44 among P1, P2 and the EISA DMA controller. If one processor requires the host bus and the other processor has the host bus, but is inactive, arbitrater circuit 74 requests the inactive processor to relinquish the bus by asserting an active signal on the processor's HOLD input line. When the inactive processor asserts a HOLD ACKNOWLEDGE (HLDA) response, control of the host bus is granted to the requesting processor by deasserting its HOLD line. If one processor requests the host bus while it is controlled by the EISA bus master, a CPUMISS* signal is asserted to arbitrator 76 in ISP circuit 54. The EISA bus master maintains control until the ISP arbitrator deasserts its H HOLD signal whereupon arbitration circuit 74 deasserts its processor H HOLD signal and the requesting processors HOLD line. If both processors are requesting control of the bus and primary processor P1 is not asserting an interrupt, the processor least-recently on the bus is granted control. If both processors are-requesting control and P1 is asserting an interrupt, P1 is granted control. If either processor has control of host bus 44, it maintains control until a request from the other processor or the EISA bus 46 is received.

Control of the host bus 44 by either processor P1 or P2 is protected from interruption by EISA bus controller 48 by an EISA arbitration inhibit timer resident in arbitration circuit 74. When control of host bus 44 is transferred to either processor P1 or P2, the timer is started and remains active for a period of time as specified in a read/write, input/output arbitration register to accommodate processor operation. As long as the timer is active, the processor with control of the host bus 44 will not be interrupted by a H HOLD from the EISA controller or the other processor's bus request; processor P2 can still be interrupted by processor P1 if processor P1 is asserting its interrupt request.

The period of the inhibit timer is set by multiplying the basic clock period of processor P1 by two and by the value set in the arbitration register under program control. At reset, the arbitration value is zero (no arbitration inhibit) and is subsequently adjusted depending upon program requirements.

EISA bus 46 requires access to host bus 44 during direct memory access operation and EISA bus master cycles. The EISA bus controller 48 initiates a request for access to host bus 44 by asserting a H HOLD signal to arbitration circuit 74. If the EISA inhibit timer is not active, or when the processor which controls the bus deasserts its bus request, arbitration circuit 74 requests the bus by asserting its HOLD line to the controlling processor. When the controlling processor asserts its HOLD ACKNOWLEDGE signal, access to the host bus 44 is granted to the EISA bus 46 by the arbitration circuit asserting an active HHLDA acknowledge signal. Control by EISA bus 46 is thereafter maintained until H HOLD is deasserted. The H HOLD signal is synchronized to CLK1* (P1 primary clock signal, negative component). HHLDA is synchronized to CLK1* before being asserted.

In the drawings, logic circuit 150 designates generally processor control and communication application specific integrated circuit which includes logic circuits necessary to generate a variety of interprocessor control and communications signals. Circuit 150 includes circuitry to accomplish processor reset requests and reset signal generation for the primary and secondary processors. Circuit 150 also includes a communication Input/Output register for facilitating interprocessor communications and processor control. In the preferred embodiment an eight-bit register is provided for each processor in the system. These registers are part of a processor control logic circuit for each processor. These registers can be either input/output or memory mapped and are decoded from four pseudo address lines designated PRS3 to PRS0.

While circuit 150 is illustrated as a single block, it should be understood that functions performed in this logic circuit as well as other logic circuits described generally herein can be distributed to other single purpose or multipurpose integrated circuits without departing from the present invention. The distribution of logic functions to one or more integrated circuits is largely a matter of design choice within the ordinary skill in the art. In the preferred embodiment, the functions described herein as within circuit 150 are physically located in portions of two separately packaged gate-arrays which integrate a number of system control and communications functions. These two gate-arrays also integrate a number of other functions for the system C shown herein as separate schematic blocks.

RESET AND PROGRAMMABLE RESET (RESTART)

Figure 3:
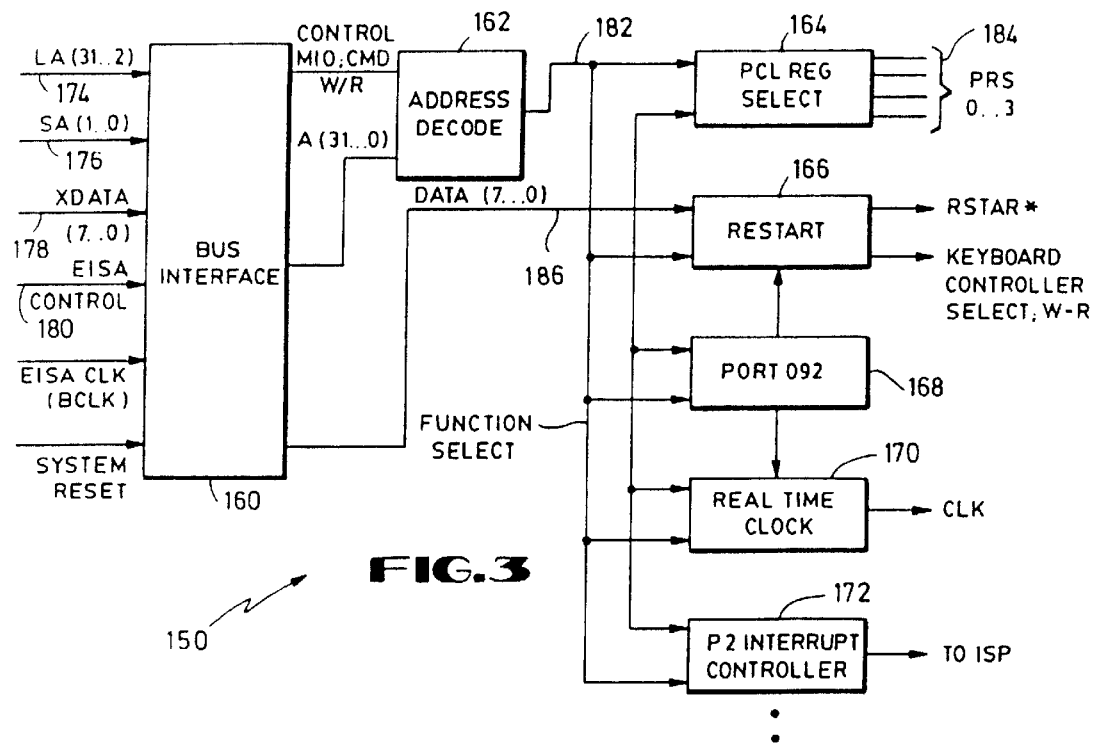
FIG. 3 is a schematic diagram of one portion of the system shown in FIGS. 1 and 2.

Referring now to FIG. 3, a schematic block diagram of a portion of logic circuit 150 is illustrated. This portion of circuit 150 includes a bus interface 160, an address decode circuit 162, processor control logic register select circuit 164, programmable reset or restart logic circuit 166, a reset control port 168, a real time clock circuit 170 and a secondary processor interrupt control circuit 172. Additional processor control or communication function blocks may be included in this general scheme to accommodate other functions which are not relevant to the present invention.

Bus interface 160 connects circuit 150 to the designated elements of system busses. Line 174 represents the LA address lines of EISA bus 46. Line 176 represents the SA/ISA address lines of bus 46. Line 178 represents the data lines from X bus 90, and line 180 represents the control lines from EISA bus 46. This interface provides circuit 150 with access to the data, address or control signals present on these system busses.

Decoder 162 receives combined address signals 31 to 0 and command (CMD) and Memory Input/output (MIO) signals via lines 174 and 176 and interface 160. Decoder 162 decodes these signals to produce a function select output 182. Decoder 162 consists of latches and decode logic used to select via output 182 the logic function required by the system C. Each block 164, 166, 168, 170 and 172 requires an enabling select signal. Address inputs A 31 . . 0 are completely decoded to select memory locations. Input/output locations are decoded from inputs LA (15 . . 2) and (SA 1 . . 0). Bus interface 160 and decoder 162 provide an eight-bit ISA interface for system input/output operations and a sixteen bit EISA interface for memory locations both of which are utilized for system functions in addition to those germane to the present invention.

Logic circuit 164 contains the processor control logic (PCL) register selects. Address inputs 15 through 0 and the MIO input are used to decode the PCL register selects which are latched to output lines 184 referred to herein as processor register select (PRS) lines. In the preferred embodiment circuit 164 decodes processor control select signals in the form of actual addresses 0C6A (hex) and FC6A (hex) to select primary and secondary processor control, respectively, and provides four bit pseudo addresses 0100 and 0101 on PRS lines 184. The PRS pseudo addresses are utilized to select processor control registers resident in another circuit.

Logic circuit 166 is selected by system C to generate a RESTART signal which is utilized to reset the processors only, independent of the cache controllers and other system components which are reset for hardware system reset signals only. This feature enables keyboard entry of a processor reset or, in conjunction with circuit 168, programmed independent processor reset, as described herein.

Restart logic circuit 166 consists of a state machine which monitors keyboard commands and data via address decode 162 and data line 186 which interconnects to the system keyboard interface via bus interface 160 and the X data bus 90. Circuit 166 intercepts keyboard commands which need to be processed locally before being passed to the keyboard processor or controller.

Keyboard controller commands are writes to the keyboard controller at address 64 (hex). This command together with any data signal on line 186 consisting of FxxxO (hex) constitutes a Restart (processor reset). When this command/data signal is detected, circuit 166 causes a processor Restart signal to be generated. The Restart logic consists essentially of a counter which generates time delays based upon the bus CLK signal from the EISA system clock.

Every time a Restart command is received, circuit 166 causes a delay of fifteen microseconds followed by the assertion of the RSTAR* output (active low) for a period of five microseconds, then returns the RSTAR* output to inactive, logic high level. This RSTAR* signal is utilized by other circuitry described herein to restart the primary processor in response to programmed or keyboard command.

In some application software it may be desirable to provide for programmed (as distinguished from keyboard) processor Restart. One example would be the need to cause the primary processor to revert from protected to real mode. System C provides for this function via circuit 168. Circuit 168 contains an eight-bit register at IO address 0092 (hex) which controls logic to disable Real-Time clock addresses 37-3F (hex) and activate processor Restart logic 166. This eight-bit register may be utilized for other system control functions in addition to the Restart function.

After system reset, circuit 168 is disabled. Writing a logic value one to bit 5 of the Port 092 register will enable the circuit. In the preferred embodiment, bit zero of the eight-bit register is utilized to initiate a processor restart. After system reset, bit zero is set to a logic zero value. Thereafter, writing a one to this bit will cause Restart logic 166 to generate a RSTAR* signal in the manner described above.

Circuit 170 is a real time clock interface circuit which is selectively enabled via address decode circuit 162 to allow read and write commands to access the real time clock 104 for a variety of purposes. For the purposes of the present invention it is only important to note that upon system reset, logic circuit 170 includes logic which prevents write or read commands to clock 104 from being interrupted for the cycle in progress.

Processor Control Logic

Referring now to FIG. 4, another portion of communication and control logic circuit 150 is illustrated in block diagram form. FIG. 4 illustrates the processor control circuits within circuit 150 which relate to interprocessor communication and reset, restart control functions. This portion of circuit 150 includes PCL circuits 186 and 188 which relate to control functions for the primary processor P1 and secondary processor P2, respectively. It should be understood that additional PCL circuits to support other system processors, if present, could be added but are not illustrated for clarity. Circuits 186 and 188 interface with processors P1 and P2, respectively.

Reset input 190 is a synchronized system Reset signal which transitions in phase 2 of the system clock signal. Reset only goes to an active state immediately after power up. RSTAR* input 192 is utilized for restarting the primary processor under program control. RSTAR* is input to circuit 186 only since programmed resets originating in application software are only used directly for the primary processor P1. Programmed resets for secondary processors can be made by writing to a defined address in secondary processor register 213. The RSTAR* signal originates from circuit 166 in FIG. 3.

A PHOLD output signal is generated by circuit 150 as a processor hold request to put the selected processor in hold prior to programmed reset or restart. PHOLDA input which originates with the processor is used by circuit 150 logic to ensure that the selected processor has no bus cycles in progress when a programmed reset or restart is initiated.

PRS input 202 originates with PCL Register select circuit 164 in FIG. 3 and is a four-bit pseudo address input signal used to decode one of fifteen eight-bit registers resident in circuits 186 and 188 illustrated schematically as registers 212 and 213 in FIG. 4.

Referring back to FIG. 3, a processor control signal to address OC6A (hex) is decoded by circuit 164 which presents a 0100 signal on PRS input lines 202. This pseudo address input on PRS lines 202 selects register 216 for read/write operations depending on the status of W-R input 217.

Primary processor register 216 may be used for a variety of control functions. For the purposes of the present invention, a primary processor control signal which writes a logic level one to bit six of register 216 will result in an interrupt signal 214 being provided as an IRQ13 signal to the primary processor via integrated system peripheral subcircuit 70. Bit six of register 216 is reset to zero on power up. Setting this bit to one causes a primary processor interrupt which allows the secondary processors to communicate with the primary processor. A register decode logic circuit 217 is provided to decode signals in registers 212. Decode circuit 217 interprets the values in register 212 depending on the value of P1/P2 mode input 219. For the primary processor this input is hardwired to the P1 mode.

A secondary processor control register 218 is addressed at FC6A (hex) via circuit 164 which provides a decoded pseudo address of 0101 on PRS lines 202. Writing a logic level one value to bit zero of register 218 is decoded by decode circuit 219 to cause a secondary processor reset request to be initiated via reset logic described below. Register decode circuit 219 decodes the contents of register 213 based upon the status of the P1/P2 mode input, which is set to P2 mode for the secondary processors. The PRS signal enables the secondary processor to be programmably reset. The output of this bit is not provided directly to the secondary processor but is utilized in the Reset/Restart logic circuit described below. Bit zero of register 218 powers up at zero value.

To enable a secondary processor interrupt, a one is written to bit 6 of register 218. This bit is reset to zero on power up. A P2 interrupt signal 220 is generated by circuit 219 in response to bit 6 of port 218 being set to one. This enables other system components including the primary processor to communicate with the secondary processor. Bit seven of register 218 is an interrupt disable INTDIS bit which when set to one prevents the secondary processor from interrupting the primary processor.

The ERESP output signal is the early reset signal for the processors only, as distinguished from the cache controllers 24 and 124, or other components such as the numeric co-processors. Output ERESP is generated in response to programmed processor reset requests, keyboard resets, or in response to a system SHUTDOWN signal. The ERESP signal is also used to reset the processors in response to a hardware system reset as described below. The ERESP signal is resynchronized by E-PAL circuits 224, 226 associated with each processor control circuit 186, 188, respectively, to the falling edge of the system CLK1* signal, which is the clock signal used internally by the processors. CLK1 is generated by dividing the system clock signal from clock 170 designated CLK2, by two. The resynchronization is necessary to meet the 80386 setup/initialization timing requirements.

Detailed Reset/Restart Logic Circuitry

Referring now to FIG. 5, the details of reset control logic circuit 230 shown in block diagram form in FIG. 4 are illustrated. This circuit controls the generation of reset signals for the processors only. A processor reset output signal 232 is provided in response to RSTAR*, PRST or SHUTDOWN input signals on lines 234, 236 and 238, respectively. Hardware system resets are received via input 190 and also cause a processor ERESP reset signal to be generated. Circuit 230 is duplicated in each processor control logic circuit 186, 188 etc. associated with primary and secondary processors.

To facilitate mass manufacturing, circuit 230 is designed to receive either RSTAR* or PRS inputs depending upon whether the particular circuit 230 is used with a primary processor control circuit or a secondary processor control circuit. For primary processor control, the RSTAR* input is connected to the output of circuit 166 to enable primary processor programmed or keyboard initiated resets. For secondary processor control circuits, the RSTAR* input is not connected. Secondary processor programmed resets are initiated in response to the PRST signal generated by a decoded secondary processor reset request from decode circuit 219 in FIG. 4. In all applications, a system SHUTDOWN input signal, which is generated by the system C in response to conditions indicative of major malfunctions, is treated as a programmed reset request.

Throughout the following detailed description, in accordance with industry practice, logic signals which are active at a low level will be identified with an asterisk following the signal identifier, such as RQ2*.

Hardware Reset

Hardware resets result from power on or other switched reset conditions as distinguished from programmed or keyboard initiated resets. It is not important to independently reset the processors on hardware reset because all system elements will be reset synchronously and no bus contention or cache incoherency will result. In the present system, the system elements other than the processors, such as the cache controllers and numeric coprocessors, are reset by hardware reset in a conventional manner. The processors are also reset on hardware resets, but the reset signal for the processors is generated by an independent processor reset control circuit 230 which responds to the system hardware reset signal.

Referring now to FIG. 5, the details of circuit 230 are illustrated. System reset signal RST is provided as a reset signal to flip-flop 246 via inverter 252. Consequently, output RESCPU* is set to an active low state. Output RESCPU* is provided as a D-input to flip-flop 248. Flip-flop 248 is clocked by clock signal MCLK1. MCLK1 is generated by taking the NAND product of CLK2* and CLK1* to synchronize the ERESP output to the first phase of CLK1 used internally by the processor. Following Reset, signal RST reverts to a low level, and on the first ZCLK1R pulse the RESCPU* and RESCPU signals are set to inactive high and low levels, respectively.

For a 80386 processor, system reset is required to be maintained active for at least 15 CLK2 periods or 78 CLK2 periods if a self test is going to be executed following reset. In the present system, the ERESP output will remain active in response to the RST system reset on terminal 190. RST is generated in other circuitry in the system C to comply with processor reset requirements.

Programmed Processor Reset

Keyboard initiated, and software or program controlled resets of the processors independently from the other system elements is provided under the control of circuit 230, illustrated in FIG. 5. After system reset, the output signals of flip-flops 240, 242, 244, 246 and 248 are set to their respective inactive values. Signals RQ2*, RQ1*, RQ0* and RESCPU* are inactive, high. The ERESP output of circuit 248 is inactive low. The PHOLD output of flip-flop 250 is inactive low. The output signal on line 258 of flip-flop 256 is inactive low, as are the other inputs to ORGATE 260. The PRST input to ORGATE 260 is only active high in response to a secondary processor programmed at keyboard initiated reset request. The SHUTDOWN input is only active high in response to a processor signal indicative of major system malfunctions requiring system shutdown.

A primary processor programmed or keyboard reset causes signal RSTAR* to be set to an active low level. The RSTAR* signal is provided as a D-input to flip-flop 256. Flip-flop 256 is clocked by signal ZCLK1R. ZCLK1R is generated as the output of NANDGATE 271 which has the CLK1 and CLK2* signals as inputs. CLK1 is the clock signal used internally by the processor. CLK2 is the system clock which runs at twice the frequency of CLK1. CLK2* is the inverse of CLK2. The NAND product of CLK1 and CLK2* produces a ZCLK1R signal which is synchronized to the second phase of CLK1. With RSTAR* active, the next ZCLKIR pulse sets output 258 to an active high level, thus initiating a programmed reset of the processor.

The high level signal at terminal 258 enables ORGATE 260, setting the input to ANDGATE 262 to a high level. The second input to ANDGATE 262 is fixed high. Thus, the active RSTAR* signal causes the output of ANDGATE 262 to enable ORGATE 264, setting the RO2 D-input to flip-flop 240 to an active high level.

With RO2 high, the next ZCLKIR pulse sets the RQ2 and RQ2* outputs of flip-flop 240 to active high and low levels, respectively. Output signals RQ2*, RQ1* and RQ0* are provided as input signals to three-way NANDGATE 268. When RQ2* is set low, the output of NANDGATE 268 is set high. This output is designated RESREQ and is provided as the input to inverter 269. Thus, the RQ2* active low signal sets the output of inverter 269 to a logic high level. The output of inverter 269 is provided as a D-input to flip-flop 250, which sets its PHOLD output to an active high level on the next ZCLK1R clock pulse. PHOLD is a processor hold request signal used by circuit 230 to request that the processor be placed in a hold state prior to and during a programmed reset to avoid interrupting ongoing processor bus cycles.

The high level active RESREQ output of gate 268 is also provided as a first input to NANDGATE 270. NANDGATE 270 is therefore enabled when the processor returns an active PHLDA signal, acknowledging the hold request, which enables ORGATE 272. Thus once the PHLDA signal is active, the output of gate 270 is set active high. The output of gate 270-is provided as a D-input to flip-flop 246 so that on the next ZCLK1R pulse the RESCPU* output of flip-flop 246 is set to its active low level. An active RESCPU* signal initiates the generation of a synchronized ERESP signal via flip-flop 248 as described above with regard to hardware resets.

For programmed resets, it is desirable to provide a reset signal with a defined pulse width. It is therefore necessary to maintain the ERESP output signal active for a specified period. To accomplish this, circuit 230 includes a three-bit grey-code counter circuit comprised of flip-flops 244, 242 and 240 with associated logic gates. This circuit maintains the ERESP signal active for sixteen CLK2 counts to comply with the 80386 reset requirements.

As described above, when a programmed reset is initiated the RESCPU output signal from flip-flop 246 is active high. This signal is provided as an input to ANDGATE 274. At this time output RQ2* is low, and outputs RQ0*, and RQ1* are at inactive high levels assumed after reset. These three outputs are provided as the inputs to NANDGATE 268. The output signal RESREQ of NANDGATE 268 will remain active high as long as one of signals RQ2*, RQ1*, or RQ0* is low. If RESREQ is active high, and ORGATE 272 is enabled, the RESCPU* output of flip-flop 246 will remain active low, thereby maintaining the ERESP signal active.

After a programmed reset is active, the RESCPU output of flip-flop 246 is set to an active high level. This signal is provided as an enabling input to ORGATE 272. NAND-GATE 270 will remain enabled after the ERESP reset signal becomes active until the RESREQ output of NANDGATE 268 is set low. Thus, the duration of the ERESP active signal is controlled by the status of the RQ2*, RQ1* and RQ0* inputs to NANDGATE 268.

Referring back now to the input to ANDGATE 274, when the RESCPU signal is active high indicating the start of a programmed reset, the RQ2 and RQ1* inputs are also high. RQ2 was set high at the beginning of the programmed reset cycle and RQ1* remains high as a condition set after hardware reset. Thus, the RESCPU high signal enables ANDGATE 274, which disables NORGATE 276, which in turn disables ANDGATE 278, setting the input to flip-flop 244 low. On the next ZCLK1R signal, outputs RQ0* and RQ0 will be set to active low and high levels, respectively.

This change in state for RQ0* and RQ0 will cause the active RQ outputs of counter circuit designated generally as circuit 280 to be set high, corresponding to a binary eight and to count down so that only after sixteen CLK2 cycles or eight CLK1 cycles will all three low outputs RQ0*, RQ1* and RQ2* be at inactive high levels.

Once RQ0*, RQ1* and RQ2* are all inactive high, NANDGATE 268 is disabled, RESREQ is set low and the ERESP signal becomes inactive in the manner described above.

As will be apparent when either the secondary processor reset signal PRST or the SHUTDOWN signal which are inputs to ORGATE 260 go to an active high level, circuit 230 causes a ERESP output from flip-flop 248 in the same manner as described above with respect to the RSTAR* primary processor programmed reset signal.

Figure 6:
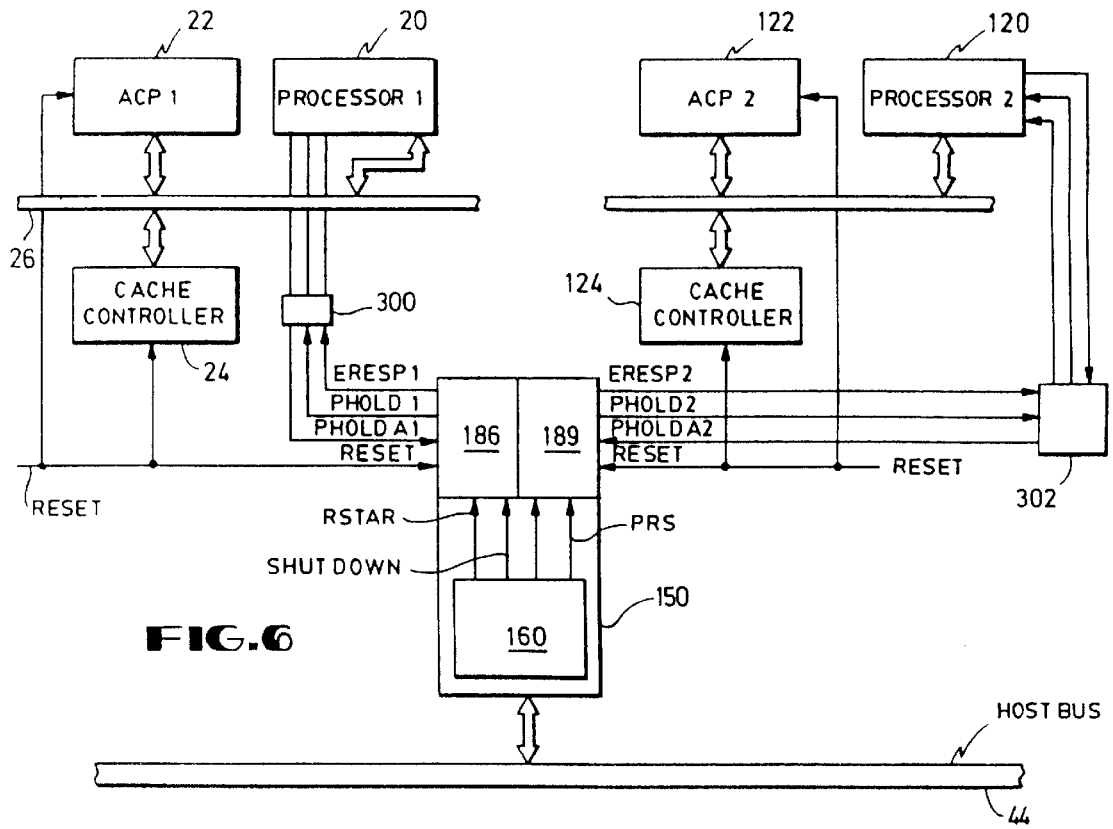
FIG. 6 is a schematic block diagram illustrating a portion of the system shown in FIGS. 1 and 2.

Referring now to FIG. 6, the present invention provides a method and system for independently resetting primary and secondary processors 20 and 120 respectively under program control, without causing cache controllers 24 or 124 to reset. The processors 20 and 120 are reset via control circuit 150. Cache controllers 24 and 124, as well as coprocessors 22 and 122 are reset by power on reset signals only and are not effected by programmed or keyboard initiated resets. Programmed resets are detected and decoded via a bus interface and processor select circuit 160 which interfaces with system host bus 44 and other busses.

Depending on the particular processor and bus timing in the system, it may be necessary to condition the ERESP processor reset signals prior to providing them to the processor reset input terminals. Generally, it is desirable not to reset the processors until a valid system power on condition exists, and to coordinate the timing of processor resets with host bus requests and other system events. Such functions are typically carried out by a programmed logic array circuit illustrated schematically as circuits 300 and 302, interfaced between circuits 186 and 188 and the respective processors. The design of such circuits is a matter of ordinary skill in the art and do not form a part of the present invention.

We claim:

1. A multiprocessor system comprising:
    system memory to store information;
    a first processing unit coupled to a bus, the first processing unit including a first processor, a first cache memory associated with the first processor to store a duplicate of a portion of the information, a first cache controller to control the first cache memory, a first numerical processor associated with the first processor, a first reset input node and a first partial-reset input node, wherein the first processing unit is reset in response to a system reset signal being asserted at the first reset input node and wherein only selected portions of the first processing unit are reset in response to a partial-reset signal being asserted at the first partial-reset input node; and
    a second processing unit coupled to the bus, the second processing unit including a second processor, a second cache memory associated with the second processor to store a duplicate of a portion of the information, a second cache controller to control the second cache memory, a second numerical processor associated with the second processor, a second reset input node and a second partial-reset input node, wherein the second processing unit is reset in response to the system reset signal being asserted at the second reset input node and wherein only selected portions of the second processing unit are reset in response to the partial-reset signal being asserted at the second partial-reset input node.

2. The system of claim 1 and further comprising:
    a second bus;
    bus interface circuitry coupled between the bus and the second bus.

3. The system of claim 1 and further comprising video circuitry coupled for accessing by the first processing unit and the second processing unit.

4. The system of claim 1 and further a hard drive coupled for accessing by the first processing unit and the second processing unit.

5. The system of claim 1 and further comprising a speaker coupled for accessing by the first processing unit and the second processing unit.

6. The system of claim 1 and further comprising a keyboard controller coupled for accessing by the first processing unit and the second processing unit and a keyboard coupled to the keyboard controller.

7. The system of claim 6 wherein the keyboard controller receives commands from one of the first or second processing units and generates the partial-reset signal in response to at least one of the commands.

8. The system of claim 7 wherein keyboard controller is coupled to an ISA bus.

9. The system of claim 1 and further comprising a restart logic circuit to receive a command and provide the partial-reset signal responsive to the command.

10. The system of claim 9 wherein the command comprises an I/O command to a port.

11. The system of claim 10 wherein the command comprises an I/O command to port 92.

12. The system of claim 9 wherein the command comprises a command to a keyboard controller.

13. The system of claim 12 wherein the command comprises a command to address 64.

14. The system of claim 9 wherein the restart logic circuit comprises a processor reset data register coupled to the bus, wherein the processor reset data register stores data which is used to generate a partial-reset request.

15. The system of claim 9 wherein the restart logic circuit places the first processing unit in a known state and further resets only the selected portions of the first processing unit after the first processing unit has been placed in the known state.

16. The system of claim 1 wherein the first processor, the first cache memory, the first cache memory controller and the first numerical processor are physically separate integrated circuits.

17. The system of claim 1 wherein the second processing unit is a duplicate of the first processing unit.

18. A multiprocessor system comprising:
    system memory to store information;
    a first processing unit coupled to a bus, the first processing unit including a first processor, a first cache memory associated with the first processor to store a duplicate of a portion of the information, and first logic circuitry to reset at least a portion of the first processor in response to a system reset signal or a processor-only reset signal, the first logic circuitry to invalidate the first cache memory in response to the system reset signal but not the processor-only reset signal; and
    a second processing unit coupled to the bus, the second processing unit including a second processor, a second cache memory associated with the second processor to store a duplicate of a portion of the information, and second logic circuitry to reset at least a portion of the second processor in response to a system reset signal or a processor-only reset signal, the second logic circuitry to invalidate the second cache in response to the system reset signal but not the processor-only reset signal.

19. The system of claim 18 and further comprising:
    a second bus;
    bus interface circuitry coupled between the bus and the second bus.

20. The system of claim 18 and further comprising video circuitry coupled for accessing by the first processing unit and the second processing unit.

21. The system of claim 18 and further a hard drive coupled for accessing by the first processing unit and the second processing unit.

22. The system of claim 18 and further comprising a speaker coupled for accessing by the first processing unit and the second processing unit.

23. The system of claim 18 and further comprising a keyboard controller coupled for accessing by the first processing unit and the second processing unit, and a keyboard coupled to the keyboard controller.

24. The system of claim 23 wherein the keyboard controller receives commands from one of the first or second processing units and generates the processor-only reset signal in response to at least one of the commands.

25. The system of claim 18 wherein the first logic circuitry resets an arithmetic logic unit of the first processor in response to the system reset signal and the processor-only reset signal.

26. The system of claim 18 wherein the first logic circuitry resets a central processing unit of the first processor in response to the system reset signal and the processor-only reset signal.

27. The system of claim 18 wherein the first logic circuitry resets a memory management unit of the first processor in response to the system reset signal and the processor-only reset signal.

28. The system of claim 18 wherein the first and second processing units each further comprise a numerical processor, the numerical processor being reset in response to the system reset signal and including at least some portions which are not reset in response to the processor-only reset signal.

29. The system of claim 28 wherein the numerical processor is not reset in response to the processor-only reset signal.

30. The system of claim 18 and further comprising a restart logic circuit to receive at least one command and provide the processor-only reset signal responsive to the at least one command.

31. The system of claim 30 wherein the at least one command comprises at least one I/O command to a port.

32. The system of claim 31 wherein the least one command comprises at least one I/O command to port 92.

33. The system of claim 30 wherein the at least one command comprises at least one command to a keyboard controller.

34. The system of claim 33 wherein the at least one command comprises at least one command to address 64.

35. The system of claim 30 wherein the restart logic circuit comprises a processor reset data register coupled to the bus, wherein the processor reset data register stores data which is used to generate a processor-only reset request.

36. The system of claim 30 wherein the restart logic circuit places the first processor in a known state and further resets the at least a portion of the first processor after the first processor has been placed in the known state.

37. The system of claim 18 and further comprising a keyboard controller, the keyboard controller receiving commands from one of the first or second processing units and generating the processor-only reset signal in response to at least one of the commands.

38. The system of claim 18 wherein the first processor, the first cache memory, the second processor and the second cache memory are physically separate integrated circuits.

39. The system of claim 18 wherein the second processing unit is a duplicate of the first processing unit.

40. A multiprocessor system comprising:
a first bus;
a system memory to store information;
a first processing unit coupled to the first bus, the first processing unit including a first processor, a first cache memory associated with the first processor to store a duplicate of a portion of the information, a first cache controller to control the first cache memory, a first numerical processor associated with the first processor, a first reset input node and a first partial-reset input node, wherein the first processing unit is reset in response to a system reset signal being asserted at the first reset input node and wherein only selected portions of the first processing unit are reset in response to a partial-reset signal being asserted at the first partial-reset input node;
a second processing unit coupled to the first bus, the second processing unit including a second processor, a second cache memory associated with the second processor to store a duplicate of a portion of the information, a second cache controller to control the second cache memory, a second numerical processor associated with the second processor, a second reset input node and a second partial-reset input node, wherein the second processing unit is reset in response to the system reset signal being asserted at the second reset input node and wherein only selected portions of the second processing unit are reset in response to the partial-reset signal being asserted at the second partial-reset input node;
a second bus;
bus interface circuitry coupled between the first bus and the second bus;
video circuitry coupled for access by the first and second processing units;
a hard disk drive coupled for access by the first and second processing units;
a speaker driver coupled for access by the first and second processing units;
a speaker coupled to the speaker driver;
a keyboard controller coupled for access by the first and second processing units; and
a keyboard coupled to the keyboard controller.

41. The system of claim 40 wherein the video circuitry, the hard disk drive, the speaker driver and the keyboard controller are coupled to the first and second processing units through the first bus and through the second bus.

42. The system of claim 41 and further comprising a third bus, wherein the video circuitry, the hard disk drive, the speaker driver and the keyboard controller are coupled to the first and second processors through the first bus, through the second bus and through the third bus.

43. The system of claim 40 wherein the keyboard controller receives commands from one of the first or second processing units and asserts the partial-reset signal in response to selected ones of the commands.

44. The system of claim 40 wherein the information stored in the system memory comprises program instructions and data.

45. The system of claim 40 wherein the second processing unit is a duplicate of the first processing unit.

46. The system of claim 40 wherein the first processor, the first cache memory, the first cache memory controller and the first numerical processor are physically separate integrated circuits.

47. The system of claim 46 wherein the second processing unit is a duplicate of the first processing unit.

48. The system of claim 40 and further comprising a restart logic circuit to receive at least one command via the first bus and provide the partial-reset signal responsive to the at least one command.

49. The system of claim 48 wherein the at least one command comprises at least one I/O command to a port.

50. The system of claim 49 wherein the least one command comprises at least one I/O command to port 92.

51. The system of claim 48 wherein the at least one command comprises at least one command to a keyboard controller.

52. The system of claim 51 wherein the at least one command comprises at least one command to address 64.

53. The system of claim 40 wherein the second bus comprises an EISA bus.

54. The system of claim 40 and further comprising a plurality of expansion slots coupled to the second bus.

55. A multiprocessor system comprising:
a system memory to store information;
a first processing unit coupled to a first bus, the first processing unit including a first processor, a first cache memory associated with the first processor to store a duplicate of a portion of the information, a first cache controller to control the first cache memory, a first numerical processor associated with the first processor, a reset input node and a partial-reset input node, wherein the first processing unit is reset in response to a system reset signal being asserted at the reset input node and wherein only selected portions of the first processing unit are reset in response to a partial-reset signal being asserted at the partial-reset input node;
a second processing unit coupled to the first bus, the second processing unit including a second processor, a second cache memory associated with the second processor to store a duplicate of a portion of the information, a second cache controller to control the second cache memory, a second numerical processor associated with the second processor, a second reset input node and a second partial-reset input node, wherein the second processing unit is reset in response to the system reset signal being asserted at the second reset input node and wherein only selected portions of the second processing unit are reset in response to the partial-reset signal being asserted at the second partial-reset input node;
a keyboard controller, the keyboard controller receiving at least one keyboard controller command from one of the first or second processing units and asserting the partial-reset signal in response to the at least one keyboard controller command; and
an integrated circuit receiving at least one port 92 command from one of the first or second processing units and asserting the partial-reset signal in response to the at least one port 92 command.

56. The system of claim 55 and further comprising:
a second bus;
bus interface circuitry coupled between the first bus and the second bus;
video circuitry coupled for access by the first and second processing units;
a hard disk drive coupled for access by the first and second processing units;
a speaker driver coupled for access by the first and second processing units; and
a speaker coupled for access by the speaker driver.

57. The system of claim 56 wherein the video circuitry, the hard disk drive, the speaker driver and the keyboard controller are coupled to the first and second processors through the first bus and through the second bus.

58. The system of claim 57 and further comprising a third bus, wherein the video circuitry, the hard disk drive, the speaker driver and the keyboard controller are coupled to the first and second processors through the first bus, through the second bus and through the third bus.

59. The system of claim 55 wherein the second processing unit is a duplicate of the first processing unit.

60. The system of claim 55 wherein the first processor, the first cache memory, the first cache memory controller and the first numerical processor are physically separate integrated circuits.

61. The system of claim 60 wherein the second processing unit is a duplicate of the first processing unit.

62. A multiprocessor system comprising:
a bus;
system memory to store information;
a first processing unit coupled to the bus, the first processing unit including a first processor, a first numerical processor associated with the first processor, a first reset input node and a first partial-reset input node, wherein the first processing unit is reset in response to a system reset signal being asserted at the first reset input node and wherein only selected portions of the first processing unit are reset in response to a partial-reset signal being asserted at the first partial-reset input node; and
a second processing unit coupled to the bus, the second processing unit including a second processor, a second numerical processor associated with the second processor, a second reset input node and a second partial-reset input node, wherein the second processing unit is reset in response to the system reset signal being asserted at the second reset input node and wherein only selected portions of the second processing unit are reset in response to the partial-reset signal being asserted at the second partial-reset input node.

63. The system of claim 62 and further comprising:
a second bus;
bus interface circuitry coupled between the bus and the second bus;
video circuitry coupled for accessing by the first processing unit and the second processing unit;
a hard drive coupled for accessing by the first processing unit and the second processing unit;
a speaker driver coupled for accessing by the first processing unit and the second processing unit;
a speaker coupled to the speaker driver;
a keyboard controller coupled for accessing by the first processing unit and the second processing unit; and
a keyboard coupled to the keyboard controller.

64. The system of claim 63 wherein the keyboard controller receives commands from one of the first or second processing units and generates the partial-reset signal in response to at least one of the commands.

65. The system of claim 62 wherein the first and second processing units each further comprise a cache memory and a cache memory controller.

66. The system of claim 62 and further comprising a restart logic circuit to receive a command and provide the partial-reset signal responsive to the command.

67. The system of claim 66 wherein the command comprises an I/O command to a port.

68. The system of claim 67 wherein the command comprises a port 92 command.

69. The system of claim 66 wherein the command comprises a command to a keyboard controller.

70. The system of claim 69 wherein the command comprises a command to address 64.

71. The system of claim 66 wherein the restart logic circuit comprises a processor reset data register coupled to the bus, wherein the processor reset data register stores data which is used to generate a partial-reset request.

72. The system of claim 62 wherein the first processor and the first numerical processor are physically separate integrated circuits.

73. The system of claim 72 wherein the second processing unit is a duplicate of the first processing unit.

74. A method of operating a multiprocessor system which includes first and second processing units, each of the processing units including a processor, a numerical coprocessor, a cache controller and at least one cache memory, the method comprising the steps of:

powering up the computer system;

generating a system reset signal in response to the powering up step;

initializing the first processing unit in response to the system reset signal;

initializing the second processing unit in response to the system reset signal;

generating a partial reset signal;

responsive to the partial reset signal output, resetting only selected portions of the first and second processing units.

75. The method of claim 74 wherein the partial reset signal is generated in response to a command to a keyboard controller.

76. The method of claim 74 wherein the partial reset signal is generated in response to a command to port 92.

77. The method of claim 74 wherein the step of generating a partial-reset signal comprises the steps of:

receiving commands via a system bus; and decoding the commands to determine that the partial-reset has been requested.

78. The method of claim 77 wherein the decoding step comprises the steps of:

generating a register select signal for enabling a partial-reset data register to receive data in response to partial reset commands; and writing data to the partial-reset data register, the data used to generate a partial-reset request.

* * * * *